United States Patent [19]
Voser et al.

[11] Patent Number: 5,278,893
[45] Date of Patent: Jan. 11, 1994

[54] TELEPHONE HAVING TWO HANDSETS

[75] Inventors: Beat Voser, Granges; Markus Kappeler, Soleure, both of Switzerland

[73] Assignee: Swatch AG, Biel, Switzerland

[21] Appl. No.: 854,556

[22] Filed: Mar. 19, 1992

[30] Foreign Application Priority Data

Mar. 21, 1991 [FR] France .................. 91 03558

[51] Int. Cl.⁵ .................. H04M 11/00; H04M 9/00; H04M 1/00
[52] U.S. Cl. .................. 379/61; 379/434; 379/440; 379/441; 379/444; 455/89; 455/90
[58] Field of Search .................. 379/58, 61, 428, 439, 379/440, 441, 444, 446, 456, 455; 455/89, 90, 127, 343, 38.3

[56] References Cited

U.S. PATENT DOCUMENTS

| | | | |
|---|---|---|---|
| 3,919,491 | 11/1975 | Luce | 379/61 |
| 4,107,477 | 8/1978 | Morrison | 379/428 |
| 4,752,949 | 6/1988 | Steinbeck et al. | 379/61 |
| 4,817,138 | 3/1989 | Thomke et al. | 379/434 |
| 5,010,565 | 4/1991 | Nash et al. | 379/58 |

FOREIGN PATENT DOCUMENTS 287511 5/1988 European Pat. Off. .

Primary Examiner—Curtis Kuntz
Assistant Examiner—Vijay Shankar
Attorney, Agent, or Firm—Pollock, Vande Sande & Priddy

[57] ABSTRACT

The telephone (1) comprises a base (2) adapted to be connected to a telephone line, a first handset (4) connected to the base (2) by a flexible cord (5) and a second handset (6) connected to the base (2) by a radio link. To reduce the size of the base (2), the latter is formed with a cavity (11) in which the second handset (6) can be fully inserted, or at least substantially so. This cavity (11) communicates with the exterior of the base through an opening (11b) formed in one of the walls (2c) of the base's casing, such that the microphone and the earpiece of the second handset (6) are acoustically linked with the exterior of the base (2) and hence enable the second handset (6) to be used even when it is lodged in its cavity (11).

6 Claims, 5 Drawing Sheets

TELEPHONE HAVING TWO HANDSETS

BACKGROUND

This invention relates to a telephone adapted to be connected to a telephone line and which comprises:

a first handset including firstly a first casing and secondly a first earpiece and a first microphone that are so arranged in said first casing as to be acoustically linked with the outside of said first casing;

a second handset including firstly a second casing, and secondly a second earpiece and a second microphone that are so arranged in said second casing as to be acoustically linked with the outside of said second casing, said second handset further including a first antenna and first circuits for connecting said second earpiece and said second microphone to said first antenna;

a base including a third casing having a first cavity for receiving said first casing and a second cavity for receiving said second casing, said base further including a second antenna and second circuits for connecting said telephone line to said second antenna; and means for galvanically connecting said first earpiece and said first microphone to said telephone line; said first and second antennas and said first and second circuits being so adapted to one another as to enable said second earpiece and said second microphone to be linked to said telephone line. circuits being so adapted to one another as to enable said second earpiece and said second microphone to be connected to said telephone line.

As above, and to avoid unnecessary repetitions, use will be made throughout the following description of the term "first handset" for the handset that is galvanically connected to the base of the telephone by means including in particular a flex having at least two conductors and which is comparable to the handset of a conventional telephone, and the term "second handset" for the handset that is connected to the base by a radio link provided in particular by transmitter and receiver circuits and by antennas included in said base and said second handset.

Telephones of the kind defined above enable a user to have conversations with a correspondent with either the first handset in the usual way, in which case the user must obviously remain close to the telephone's base, or the second handset, in which case the user may move about freely up to a certain distance from the base, such distance depending obviously on the power of the transmitters and on the sensitivity of the receivers that provide the radio link between the base and the second handset.

Telephones of this kind moreover enable two persons each using one of the handsets to have a telephone conversation with one another or to have, together, a telephone conversation with a third person.

Such telephones are for instance described in German Patent specification 3434686.

In the telephone described in this patent application, the top surface of the base is shaped to define two cavities that are separated from one another by a number-selecting keyboard and which are each meant to receive one of the two handsets. This telephone is therefore quite bulky.

SUMMARY

An object of the present invention is to provide a telephone of the same kind but which takes up less space, whilst offering its user(s) the same possibilities of use as the known telephones.

According to the invention there is provided a telephone of the kind set forth above, in which the second handset may be completely fitted into the second cavity, or at least substantially so, and in which said second cavity communicates with the outside of the third casing through an opening so formed in a wall of said third casing that, when said second handset is lodged in said second cavity, said second earpiece and said second microphone are also acoustically linked with the exterior of said third casing.

DRAWINGS

Other objects and advantages of the invention will become apparent from the following description with reference to the accompanying diagrammatic drawings in which.

DESCRIPTION

Figure 1:
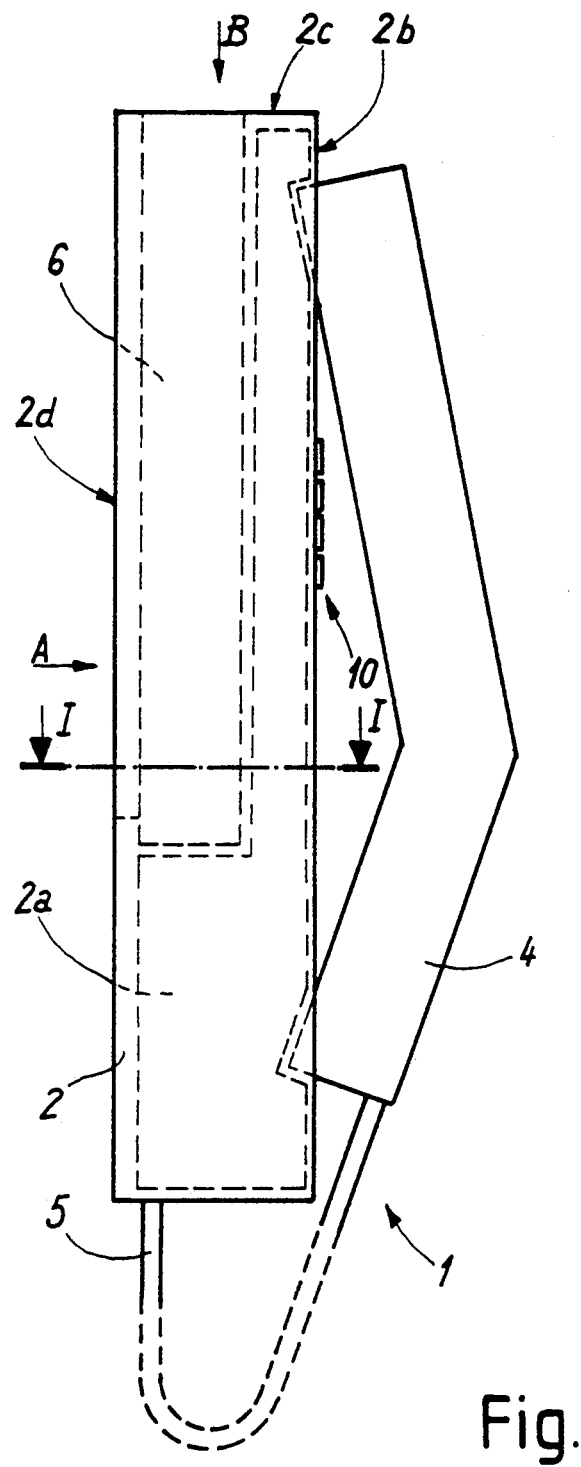
FIG. 1 is a side view of one embodiment of the telephone according to the invention.

The illustrated telephone, referenced 1, comprises a base 2 connected to the telephone network by a flex 3, a first handset 4 connected to the base 2 by a flex 5, and a second handset 6 connected to the base 2 by a radio link.

The first handset 4 includes, in usual manner, a microphone and an earpiece that are not visible in FIGS. 1 to 5. The microphone and the earpiece are galvanically connected to the base 2 by wires in flex 5 and are acoustically linked with the exterior of the casing of handset 4 through openings in the casing, which are not visible either in FIGS. 1 to 5.

The second handset 6 also includes a microphone and an earpiece, which again are not visible in FIGS. 1 to 5. This microphone and this earpiece are acoustically linked with the exterior of the casing of handset 6 through openings in the casing, visible in FIG. 2 and respectively referenced 6a and 6b. This microphone and this earpiece are moreover respectively connected to a transmitter circuit and to a receiver circuit that are located inside the casing of handset 6, in an ad hoc space 6c in FIG. 5.

These transmitter and receiver circuits are of course connected to a suitable antenna and serve to provide a radio link with corresponding circuits in base 2. The above-mentioned antenna has not been shown because it may, depending on circumstances, either be fixed and be permanently and entirely arranged inside the casing of handset 6, or be telescopic and be fully or partially collapsible into this casing. Such an antenna is well-known to specialists.

The handset 6 further includes an electric power supply source which may be a mere battery or a rechargeable accumulator and which is not visible in FIGS. 1 to 5.

When this source is a rechargeable accumulator, the latter's terminals are respectively connected to a pair of terminals provided on the outer surface of the casing of handset 6, to enable the accumulator to be recharged in a manner an example of which will be described further on.

The handset 6 includes also means for selecting a subscriber's telephone number. In the present instance, these means include a keyboard 7 which is a well-known component and which will therefore not be described in detail here. Keyboard 7 is also connected, via a control circuit, to the transmitter circuit of handset 6, such that a user of handset 6 may call up a subscriber even when he is not within reach of base 2.

Figure 2:
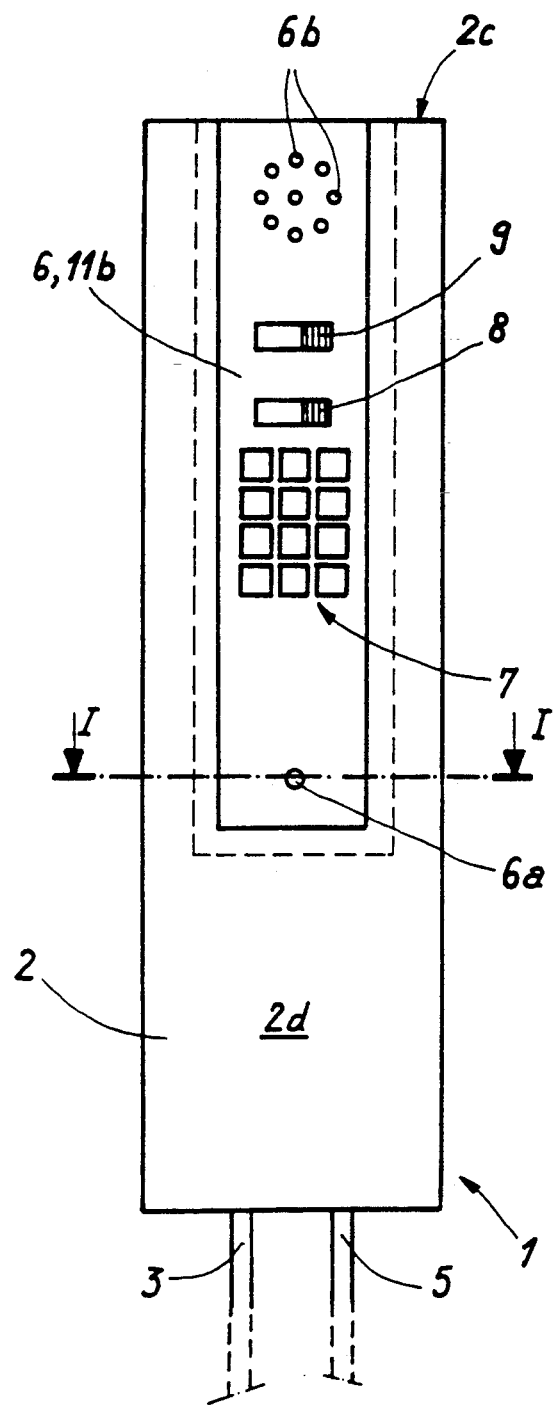
FIG. 2 is an underneath plan view of the telephone shown in FIG. 1, i.e. in the direction of arrow A.
Figure 3:
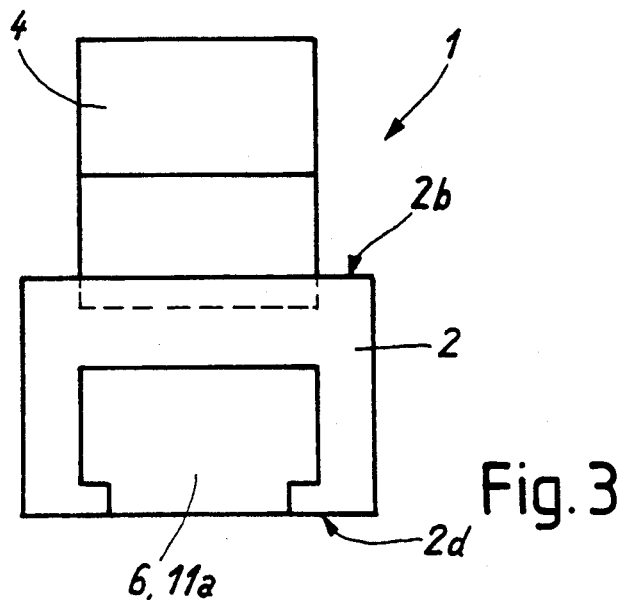
FIG. 3 is an end view of the telephone shown in FIG. 1, in the direction of arrow B.
Figure 4:
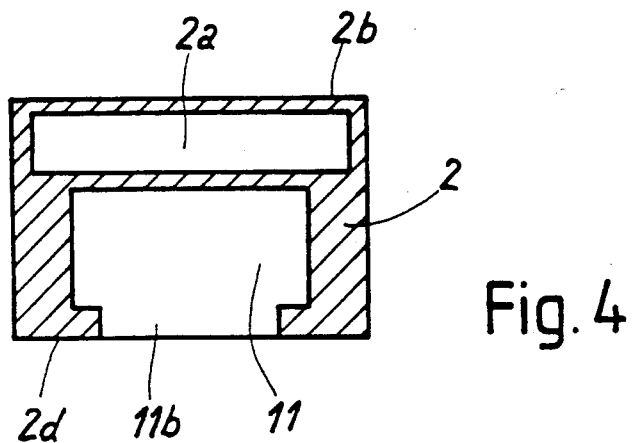
FIG. 4 is a cross-section of the casing of the telephone's base along line I—I of FIGS. 1 and 2.
Figure 5:
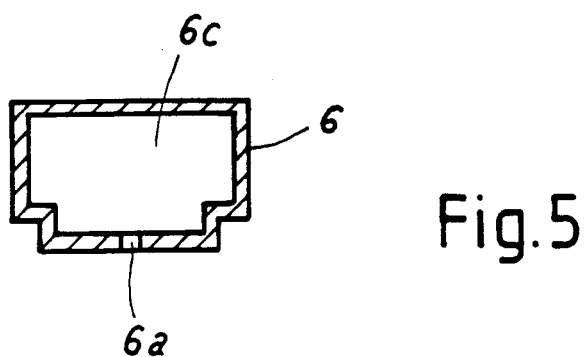
FIG. 5 is a cross-section of the casing of the telephone's second handset, along line I—I of FIGS. 1 and 2.

A pair of sliders 8 and 9 are respectively arranged in a pair of slots provided in the same wall of handset 6 as keyboard 7 and in which they may be moved manually from a first position, e.g. that shown in FIG. 2, to a second position. The sliders 8 and 9 are also respectively associated with a pair of on-off switches, not visible in FIGS. 1 to 5, which are open or closed depending on whether the sliders are in their first or second position.

As described in detail later, these on-off switches are so connected to the various circuits of handset 6 that, when handset 6 is not in its cavity 11, it is inoperative or operative depending on whether slider 8 is in the position shown in FIG. 2 or its other position, and its transmitter circuit is switched off or on depending on whether slider 9 is in the position shown in FIG. 2 or its other position.

The base 2 includes also means for selecting a subscriber's telephone number which here also include a keyboard visible in FIG. 1 and referenced 10.

The base 2 further includes a transmitter circuit and a receiver circuit which are adapted to those in handset 6, along with other electric and/or electronic components that enable a user of telephone 1 to receive a call from or to make a call to another subscriber and to converse with the latter by using either the first handset 4 or the second handset 6. These components, some examples of which are described further on, are mostly disposed inside the casing of base 2, in an ad hoc space referenced 2a in FIGS. 1 and 4.

Like the known telephone described in German Patent specification 3434686 mentioned earlier, the telephone 1 has means enabling handsets 4 and 6 to be laid to rest in specific locations when not in use.

But unlike this known telephone, only handset 4 can be laid to rest on the top surface 2b of base 2. To this end base 2 is provided with a cavity consisting, in this example, of two recesses formed in the top surface 2b of the casing of base 2 and adapted to receive the opposite ends of handset 4. Clearly, the configuration of this cavity for receiving handset 4 is directly dependent on the latter's shape, which may be very different from that shown in FIGS. 1 and 3.

As to handset 6, it may be placed in a second cavity, referenced 11, provided in base 2 and whose shape and size are of course adapted to those of handset 6.

In the present embodiment, the cavity 11 communicates with the outside through an opening 11a formed in the end wall 2c of base 2. The shape and size of opening 11a correspond to those of the cross-section of handset 6 whereby the latter may readily be slipped into cavity 11 when it is not in use, or be taken out of cavity 11 when it is to be used.

Cavity 11 moreover communicates with the outside through an opening 11b in the bottom wall 2d of base 2. Opening 11b is so shaped that openings 6a and 6b, which respectively link the microphone and earpiece of handset 6 acoustically with the exterior of the latter's casing, open out into opening 11b when handset 6 is in cavity 11. The microphone and earpiece of handset 6 are thus also acoustically linked with the exterior of base 2.

Preferably, base 2 includes also means that cooperate with corresponding means in handset 6 to prevent the latter from accidentally coming out of cavity 11. These means have not been illustrated as they may vary considerably in structure and are well-known to specialists. They may for instance include balls partly recessed in holes provided in the side walls of cavity 11 and urged by springs into engagement with corresponding holes in the side walls of handset 6 when the latter is in cavity 11.

When the handset's supply source of electrical energy is a rechargeable accumulator and the casing of handset 6 has a pair of terminals respectively connected to the accumulator's terminals, the base 2 also has a pair of terminals located in that portion of the walls of its casing that defines cavity 11 so as to come into contact with those of handset 6 when the latter is lodged in cavity 11 and thereby connect the accumulator of handset 6 to a circuit, located in base 2, through which the accumulator is recharged as described below. These terminals have not been illustrated in FIGS. 1 to 5 since their nature and their exact arrangement can be selected quite freely.

Providing, in the base of a telephone having first and second handsets respectively connected to the base by a flex and a radio link, a cavity such as cavity 11 for accommodating the second handset when not in use makes it possible greatly to reduce the overall size of the telephone compared to the size of similar known telephones.

Designing also the cavity for the second handset in a manner such that its microphone and earpiece remain acoustically linked with the exterior of the telephone's base when the second handset is lodged in the cavity makes it possible, even in this case, to use this handset to converse with someone else without removing it from its base. In such a case, the telephone according to the invention can thus be used by two people at the same time, with one using the first handset in conventional manner and the other using the arrangement formed by the base and the second handset. Such a use of the telephone according to the invention is similar to the use that can be made with the telephone disclosed in U.S. Pat. No. 4,817,138.

The telephone according to the invention can of course also be used by two people with one located near the base using the first handset and the other using the second handset and located some distance away from the base.

The shape and size of the second handset of a telephone according to the invention may of course be quite different from those of the handset 6 of the telephone shown in FIGS. 1 to 5, the shape and size of the cavity provided in the telephone's base being obviously adapted in each case to those of the second handset.

Moreover, in the embodiment shown in FIGS. 1 to 5, the shape and size of the cavity 11 are such that the second handset 6 may be fully lodged in cavity 11.

This arrangement is clearly that which is best as regards the size of telephone 1. But it might then be difficult to get hold of handset 6 to extract it from cavity 11.

One way of avoiding this possible drawback is for cavity 11 to have a shape and size such that the handset 6 will project slightly from base 2 when housed in cavity 11. With such an arrangement, handset 6 could then readily be grasped to remove it from cavity 11 without having substantially to increase the size of telephone 1.

In the illustrated embodiment also, the opening 11a through which handset 6 is inserted into cavity 11 is provided in the end wall 2c of the casing of base 2, and the opening 11b that enables the microphone and earpiece of handset 6 to be acoustically linked with the exterior of base 2 is provided in the bottom wall 2d of the base's casing.

In other embodiments, not shown, the opening 11a and/or the opening 11b may be provided in other walls of the casing of base 2. Openings 11a and 11b could even be combined into one which would then enable both the handset 6 to be inserted into cavity 11 and the microphone and the earpiece of handset 6 to be acoustically linked with the exterior of the casing of base 2.

Figure 6:
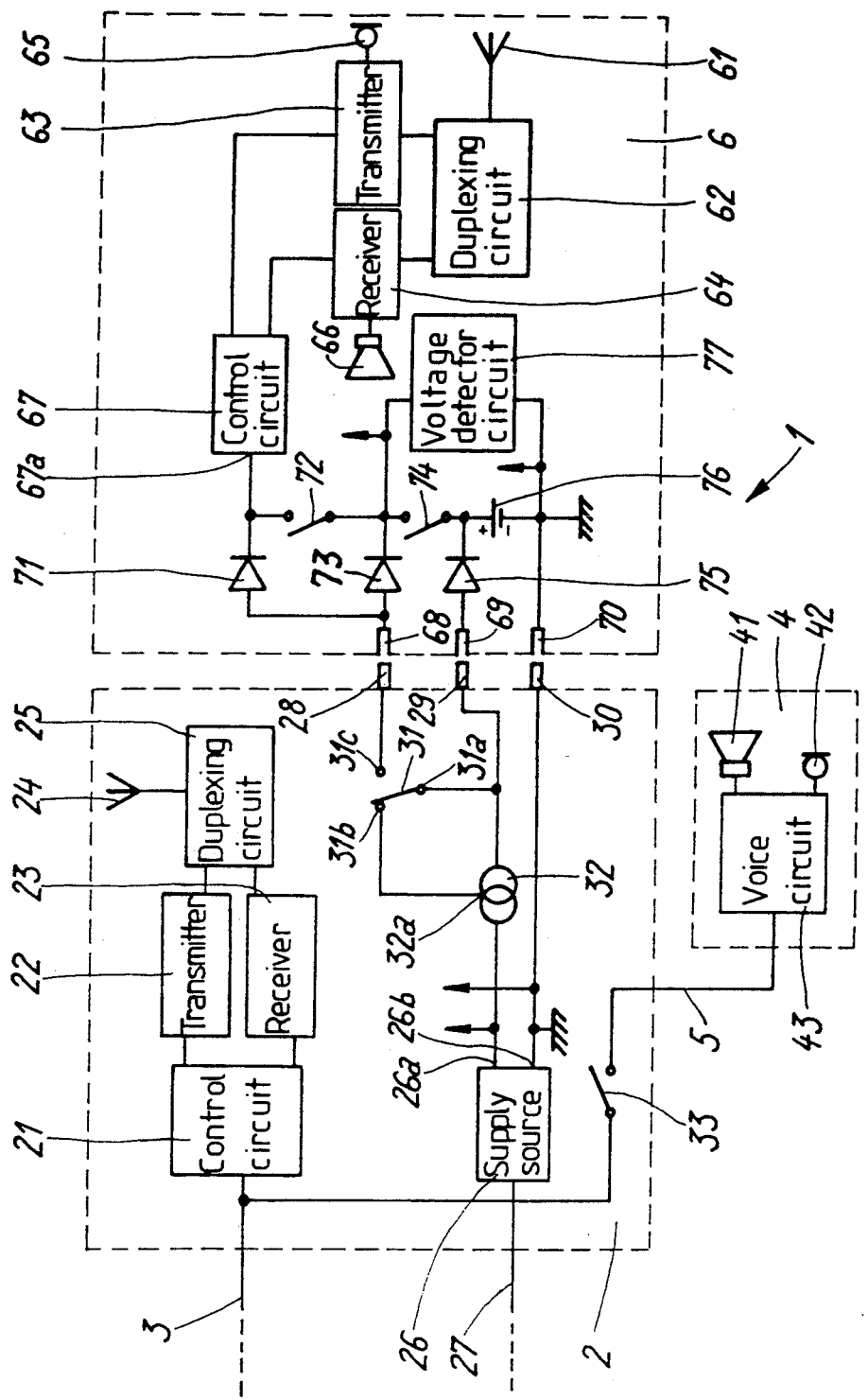
FIG. 6 illustrates electric and electronic circuits used in the illustrated telephone.

In the diagram shown by way of non limiting example in FIG. 6, the telephone, its base, the flex connecting the base to the telephone network, its first handset, the flex connecting the first handset to the base, and the second handset are respectively referenced 1 to 6 as they are in FIGS. 1 to 5. To simplify the drawing, flexes 3 and 5 are represented by a single line in FIG. 6 although they obviously include at least two wires each.

The base 2 includes a control circuit 21 connected to flex 3 and hence to the telephone network, and connected also to the transmitter and receiver mentioned earlier, now referenced 22 and 23 respectively. Transmitter 22 and receiver 23 are connected to an antenna 24 via a duplexing circuit 25.

These circuits will not be described in detail as they are well-known to specialists and are not directly concerned by the invention.

Base 2 also includes means for supplying its various circuits with stabilized d.c. voltage needed for their operation.

These means may of course simply consist of a nonrechargeable battery. To avoid having to replace it too frequently, this battery must have a large storage capacity and hence a large size since the various circuits of base 2, in particular transmitter 22, use up quite a large amount of electrical energy.

Such a large battery being difficult to house in the casing of base 2, it is preferable to use a supply source that is connected to the mains to energize the various circuits of base 2.

One such source, which is well-known, is shown at 26 in FIG. 6 linked to the mains by a flex 27, diagrammatically represented by a single line although it includes of course at least two wires. Source 26 has a pair of output terminals 26a and 26b that are connected to the input terminals of the various circuits of FIG. 2 by connections, not shown, symbolized by arrows.

Terminal 26b of source 26 is further connected to the common point, or earth, of the various circuits of base 2.

Base 2 includes moreover a connector having in this instance three plugs 28, 29 and 30. Plugs 28 to 30 are provided in a wall of cavity 11 so as to come into electrical contact, upon handset 6 being lodged in cavity 11, with three sockets provided in the casing of handset 6. The purpose of plugs 28 to 30 and of the sockets will be made clear further on.

Base 2 furthermore includes a change-over switch 31 having a common terminal 31a which is selectively connected to a second terminal 31b or to a third terminal 31c by a movable contact. The latter is for instance actuated by a mechanical pusher member, not shown, located in the bottom part of base 2, so as to connect the common terminal 31a to terminal 31b, as shown in FIG. 6, when base 2 is laid on a hard surface such as the top of a piece of furniture, and to connect the common terminal 31a to terminal 31c when base 2 is not laid on such surface.

The common terminal 31a of change-over switch 31 is connected to the plug 29 and to the output of a current source 32 the purpose of which will be described later.

The input of current source 32 is connected to the terminal 26a of supply source 26. For a reason that will also be made clear later in this description, the current source 32 further has a control input 32a connected to the terminal 31b of switch 31 and is arranged to supply current at a first intensity or at a second intensity greater than the first depending on whether or not control input 32a is connected at its output by switch 31.

The terminal 31c of switch 31 is connected to plug 28.

The plug 30 is connected to the terminal 26b of current source 26 and hence to the common point of the circuit of base 2.

Base 2 additionally includes an on-off switch 33, symbolized as a simple contact, which is series connected between flex 3 and flex 5. Switch 33 is actuated for example by a pusher member, not shown, located in the cavity for receiving first handset 4, so as to connect the latter to flex 3 and hence to the telephone network when handset 4 is used, i.e. when it is not lodged in its cavity, and to break this connection when handset 4 is so lodged.

In the example shown in FIG. 6, handset 4 simply has an earpiece 41 and a microphone 42 that are connected to flex 5 via a voice circuit 43 able to separate the signals arriving on the telephone line and meant to energize earpiece 41, from the signals produced by microphone 42 and having to be fed down the telephone line.

In another arrangement, not shown, the voice circuit 43 may be disposed in base 2, the flex 5 then including two pairs of wires respectively connecting earpiece 41 and microphone 42 to voice circuit 43.

Handset 6, also diagrammatically shown in FIG. 6, includes an antenna 61 that is connected, via a duplexing circuit 62, to a transmitter 63 and a receiver 64, respectively connected to a microphone 65 and to an earpiece 66.

These various components will not be described here since they are well-known to specialists. It should simply be noted that the microphone 65 and the earpiece 66 are those mentioned earlier and which are located in the casing of the second handset 6 opposite openings 6a and 6b respectively (see FIG. 2). It should also be noted that the transmitter 63 is tuned to the same frequency as the receiver 23 in base 2, and that the receiver 64 is tuned to the same frequency, but different from the one above, as the transmitter 22 in base 2. A radio link can thus be established between microphone 65 and earpiece 66 of second handset 6 and the telephone line to which base 2 is connected, via transmitter 63 and receiver 64, duplexer 62 and antenna 61 on the one hand, and via antenna 24, duplexer 25, receiver 23 and transmitter 22, and control circuit 22 on the other hand.

Transmitter 63 and receiver 64 are connected to a control circuit 67 which shall not be described here in detail as its structure is not directly concerned by the present invention. A few operational characteristics of control circuit 67 will later be given.

Three sockets 68, 69 and 70 are provided in the casing of handset 6 in such manner that, when the latter is lodged in the cavity 11 of base 2, they come into electrical contact with the plugs 28, 29 and 30 in cavity 11.

Socket 68 is connected via a diode 71 to an input 67a of control circuit 67 and to a first terminal of an on-off switch 72 which is the on-off switch mentioned earlier that is associated with slider 9. Socket 68 is also connected via a diode 73 to the other terminal of switch 72 and to a first terminal of another on-off switch 74, which is the on-off switch mentioned earlier that is associated with slider 8.

Socket 69 is connected via a diode 75 to the second terminal of on-off switch 74 and to the positive terminal of a rechargeable, e.g. nickel cadmium, accumulator 76, whose negative terminal is connected to socket 70 and to the common point of handset 6.

The supply terminals of the above-mentioned circuits, i.e. duplexer 62, transmitter 63, receiver 64 and control circuit 67, are respectively connected by leads not shown but symbolized by arrows, to the first terminal of on-off switch 74 and to the negative terminal of accumulator 76. This first terminal of on-off switch 74 and the negative terminal of accumulator 76 are moreover respectively connected to the terminals of a voltage detector circuit 77.

The operation of the various circuits of telephone 1 when it is being used to receive or make a call with the aid of base 2 and first handset 4 or with the aid of second handset 6 will not be described in full detail as it is well-known to specialists and is not directly concerned by the present invention.

It should simply be noted that when the second handset is not in its cavity 11, the sockets 68 to 70 are obviously not connected to the plugs 28 to 30 of base 2.

In such a situation, which is shown in FIG. 6, if on-off switch 74 is open, i.e. if slider 8 is in the position shown in FIG. 2, the various circuits of handset 6 are not energized by accumulator 76. Handset 6 is then inoperative and cannot be used for either making or receiving a call. Accumulator 76 is thus not required to supply any current and therefore does not discharge.

In this selfsame situation where handset 6 is not in its cavity 11, if on-off switch 74 is closed because the user of the second handset 6 has moved slider 8 into its second position, the various circuits of handset 6 are energized by accumulator 76, provided of course the latter is sufficiently charged.

In this case, however, if on-off switch 72 is open because the user of handset 6 has left slider 9 in, or moved slider 9 into, its first position, the input 67a of control circuit 67 receives no signal. Control circuit 67 is arranged then to produce a signal blocking transmitter 63 thereby to prevent operation thereof and to put it in a state of low energy consumption.

Receiver circuit 64, on the other hand, then operates normally, so that handset 6 is in a wait condition in which it can receive, via antenna 61 and duplexing circuit 62, a signal transmitted by the aerial 24 of base 2 indicating that a caller is seeking to get through to the user of handset 6.

When such a signal is received by handset 6, the latter issues an acoustic signal and the user of handset 6, if he wants to answer this call, must then move slider 9 into its second position, thereby closing contact 72.

In response to the control signal formed by the voltage of accumulator 76 and which is then received on the input 67a of control circuit 67, the latter cancels the blocking signal it was applying to transmitter 63. The latter then becomes operational thereby enabling the user of the second handset 6 to speak to the caller. At the end of the conversation, the user of handset 6 moves slider 9 back to its first position thereby opening on-off switch 72 again. Handset 6 is then back again in the above wait condition in which transmitter 63 is blocked.

If the user of handset 6 wants to call a correspondent, he must obviously move slider 9 to its second position, thereby closing contact 72 and unblocking transmitter 63 as described above. Transmitter 63 can then transmit to antenna 61 the various signals that serve, once picked up by antenna 24 and processed by the various circuits of base 2, to establish the communication with the desired correspondent.

As long as the on-off switch 74 is closed, the voltage detector circuit 77 is connected to accumulator 76. Detector circuit 77 is arranged to produce a signal, e.g. optical, if the voltage across the terminals of accumulator 76 drops below a set value. The user of handset 6 is then warned that accumulator 76 needs recharging for continued proper operation of handset 6.

When the second handset 6 is lodged in the cavity 11 provided in base 2, the plugs 28 to 30 that are in cavity 11 respectively come into contact with the sockets 68 to 70 of handset 6.

In this situation, the common point (earth) of base 2 is electrically connected to the common point of second handset 6 by plug 30 and socket 70, and accumulator 76 is charged or recharged by the current it receives from current source 32 via plug 29, socket 69 and diode 75.

Current source 32 is so sized that when its control input 32a is connected to its output, the current it supplies at most equals the current the latter must receive, according to the manufacturer's specifications, for it to be properly recharged.

Still in this selfsame situation, if base 2 is laid on a hard surface, hence with change-over switch 31 in the position illustrated in FIG. 6, and if on-off switch 74 is open, which normally is the case, second handset 6 is inoperative since its various circuits are not energized.

As already noted, telephone 1 can be used by two different people to converse with a common correspondent even when the second handset 6 is in its cavity 11 in base 2. Such a use of telephone 1 is made possible by in particular the fact that, in this situation, the openings 6a and 6b, which respectively acoustically link the microphone and the earpiece of handset 6 with the exterior of its casing, open out into the opening 11b in the bottom wall 2d of the casing of base 2.

When the telephone 1 is used in this way, base 2 obviously no longer rests on a hard surface, so that change-over switch 31 is in the position, not shown, where its terminal 31a is connected to its terminal 31c, as already stated.

In this situation, therefore all of the circuits of second handset 6 are energized by the voltage present at the output of current source 32, via plug 28, socket 68 and diode 73, regardless of the position of on-off switch 74.

Further, this same voltage is applied to the input 67a of control circuit 67 via plug 28, socket 68 and diode 71, with the result that, as above, the control circuit 67 cancels the signal blocking transmitter 63.

The second handset 63 is thus operative, although lodged in the cavity 11 of base 2, and the user thereof, who is holding base 2, can converse with the correspondent of the user of first handset 4 via the radio link existing between antennas 24 and 61 and via the circuits associated with these antennas.

During such use of second handset 6, current supply 32 must provide not only the current needed to charge accumulator 76 but also the current consumed by the various circuits of handset 6. In order for accumulator 76 always to receive the current it needs for charging purposes, current supply 32 is so sized as to increase the intensity of the current it supplies when its control input is not connected to its output, such being the case when base 2 is not laid on a hard surface, this increase being substantially equal of the intensity of the current consumed by the various circuits of second handset 6.

Figure 7:
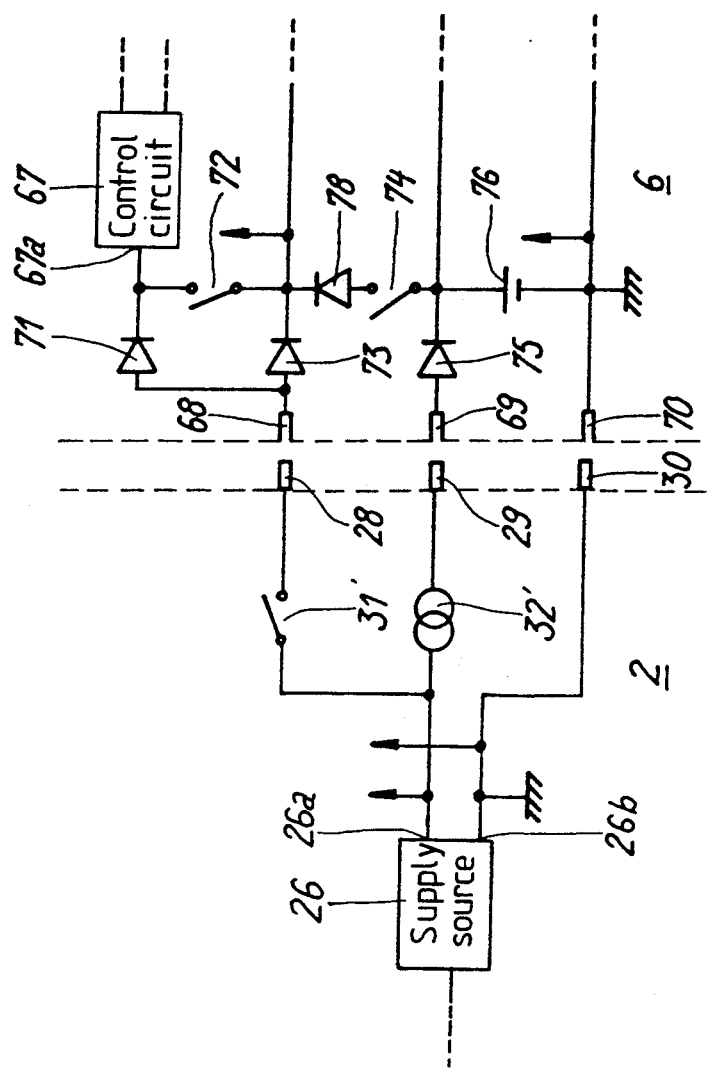
FIG. 7 illustrates a modification of part of the circuits shown in FIG. 6.

In the arrangement shown in FIG. 7, the change-over switch 31 in FIG. 6 is replaced by an on-off switch 31' having one terminal connected to the output 26a of supply source 26. Like change-over switch 31, on-off switch 31' is actuated by a pusher member, not shown, so as to be open when base 2 is laid on a hard surface such as the top of a piece of furniture, and to be closed when base 2 is not laid on such a surface.

Further, the variable current source 32 in FIG. 6 is replaced by a fixed current source 32' arranged to supply the current needed to recharge accumulator 76.

Moreover, an additional diode 78 is connected between on-off switch 74 and the positive terminal of the supply for the circuits of second handset 6.

All of the other components of telephone 1 are identical to those shown in FIG. 6 and are connected to one another in the same way as in FIG. 6.

In the FIG. 7 arrangement, the various circuits of second handset 6 are directly energized by the supply source 26 of base 2, regardless of the condition of on-off switch 74, when handset 6 is lodged in cavity 11, i.e. plugs 28 to 30 are respectively in electrical contact with sockets 68 to 70, and when base 2 is not laid on a hard surface, i.e. when on-off switch 31' is closed. In such a situation and if moreover on-off switch 74 is closed, the diode 78 prevents current from supply source 26 being added to the current that is charging accumulator 76 and which is supplied by current source 32', as this could cause the destruction of accumulator 76.

It is not possible to enumerate and to describe here all of the modifications that can be made to the above described telephone within the framework of the present invention, as they are very numerous.

For example, voltage detector circuit 72 may be combined with an on-off switch that is series-connected between socket 69 and accumulator 76, the voltage detector circuit being then arranged to open this switch and hence to interrupt the charging of accumulator 76 when the voltage across the latter's terminals reaches a value indicative of a full charge in accumulator 76.

It is also possible to interrupt the charging of accumulator 76 with the aid of a voltage detector provided within base 2 and adapted to break the connection between plug 29 and current source 32 or 32' when the voltage between terminal 29 and the common point (earth) of the circuits in base 2 reaches a value indicative of a full charge in accumulator 76.

Plugs 28 to 30 and sockets 68 to 70 may be replaced by other means providing the same electrical connections between base 2 and second handset 6. These means may for instance consist of three slightly convex conductive plates mounted in the walls of cavity 11, so as to project into the latter, and of three other conductive, also slightly convex, plates mounted in the outer wall of the casing of second handset 6 such as to come into contact with the three previous plates when second handset 6 is lodged in cavity 11. These plates may, if desired, be mounted on springs to ensure a good electrical contact between each associated pair regardless of the manufacturing tolerances for the casings on whose walls they are mounted.

Diode 71 (FIGS. 6 and 7) and its connections with socket 68 and the input 67a of control circuit 67 can be omitted. In this event, on-off switch 72 must be closed by moving slide 9 to its second position in order to be able to use handset 6 in the manner described above, whether handset 6 is lodged in cavity 11 or is outside it.

Current source 32 or 32', change-over switch 31 or on-off switch 31', plugs 28 to 30, sockets 68 to 70 and diodes 71, 73 and 75 may also be omitted. In such a case, accumulator 76 must be removed from the casing of second handset 6 when voltage detector 77 indicates it is run down, and placed in a suitable charger, separate from telephone 1, to be recharged. In this selfsame case, the circuits of second handset 6 can be energized by a simple, non-rechargeable, battery that is connected in place of accumulator 76. This battery must then be replaced by a new one when voltage detector 77 shows that is is run down.

In a case similar to that shown by FIG. 7, it is also possible to provide a non-rechargeable battery to energize the circuits of second handset 6 whilst retaining on-off switch 31', plugs 28 to 30, sockets 68 to 70 and diodes 71, 73 and 75, but of course removing current source 32' and directly connecting the output 26a of source 26 to plug 29. In this event, an additional diode should preferably be connected in series with the battery to avoid damage to the latter should its voltage drop to below that of supply source 26.

What is claimed is:

1. A telephone adapted to be connected to a telephone line and which comprises:
    a first handset including a first casing, a first earpiece and a first microphone, said first earpiece and said first microphone being so arranged in said first casing as to be acoustically linked with the outside of said first casing;
    a second handset including a second casing, a second earpiece and a second microphone, said second earpiece and said second microphone being so arranged in said second casing as to be acoustically linked with the outside of said second casing, and said second handset further including a first antenna and first circuits for connecting said second earpiece and said second microphone to said first antenna;
    a base including a third casing having a first cavity for receiving said first casing and a second cavity for receiving said second casing, said base further including a second antenna and second circuits for connecting said telephone line to said second antenna; and,
    means for galvanically connecting said first earpiece and said first microphone to said telephone line;

said first and second antennas and said first and second circuits being so adapted to one another as to enable said second earpiece and said second microphone to be linked to said telephone line;

said second handset and said second cavity being shaped and dimensioned for said second handset to be inserted at least substantially completely into said second cavity;

and an opening being provided in a wall of said third casing for said second earpiece and said second microphone to be also acoustically linked with the exterior of said third casing when said second handset is lodged in said second cavity.

2. A telephone as in claim 1, wherein said third casing has a top wall and a bottom wall, wherein said first cavity is provided in said top wall and said opening is provided in said bottom wall.

3. A telephone as in claim 1, wherein:

said second handset includes a first source of electrical energy that is rechargeable for energizing said first circuits, first manually actuatable means that are connected in series between one of the terminals of said first source and a first supply terminal of said first circuits and which are manually actuatable between first and second conditions respectively to turn on and to turn off the energization of said first circuits, said base includes a second source of electrical energy for energizing said second circuits and for recharging said first source of electrical energy, and first and second terminals that are provided on a portion of the walls of said third casing defining said second cavity and which are connected to said second source of electrical energy; and said second handset further includes third and fourth terminals that are connected to said first source of electrical energy and which are provided on a portion of the walls of said second casing such as to be in electrical contact respectively with said first and second terminals when said second handset is lodged in said second cavity.

4. A telephone as in claim 3, wherein said second source of electrical energy includes a current source that is connected in series with one of said first and second terminals.

5. A telephone as in claim 3, wherein:

said base includes a fifth terminal which is also provided on said portion of the walls of said third casing and means for making or breaking an electrical connection between said fifth terminal and said second source of electrical energy depending on whether or not said base is laid on a support;

said second handset includes a sixth terminal that is provided on the walls of said second casing such as to be in electrical contact with said fifth terminal when said second handset is lodged in said second cavity, said sixth terminal being connected to said first supply terminal of said first circuits wherein.

6. A telephone as in claim 5:

said first circuits include a transmitter circuit which is connected to said second microphone and to said first antenna and which is adapted to be in an inoperative state or an operative state in, respectively, the presence or absence of a blocking signal, and a control circuit including a control input and adapted to produce or cancel said blocking signal in response to, respectively, the absence or presence of a control signal at said control input;

said second handset includes second manually actuatable means adapted to be in a first condition in which they establish an electrical connection between said first supply terminal of said first circuits and said control input of said control circuit, or a second condition in which they break said electrical connection; and said sixth terminal is connected to said control input of said control circuit, said control signal being formed by the voltage that is present on said first supply terminal of said first circuits when said second manually actuatable means are in said first condition and by the voltage that is present on said sixth terminal when said second handset is lodged in said second cavity.

* * * * *

UNITED STATES PATENT AND TRADEMARK OFFICE
CERTIFICATE OF CORRECTION

PATENT NO. : 5,278,893

DATED : January 11, 1994

INVENTOR(S) : BEAT VOSER et al.

It is certified that error appears in the above-identified patent and that said Letters Patent is hereby corrected as shown below:

Column 12, line 17, delete "wherein"; and
           line 18, after "5" insert --, wherein--.

Signed and Sealed this

Fourteenth Day of June, 1994

Attest:

BRUCE LEHMAN

Attesting Officer      Commissioner of Patents and Trademarks